(12) United States Patent
Muniswamy et al.

(10) Patent No.: US 8,719,704 B2
(45) Date of Patent: May 6, 2014

(54) SEAMLESS INTEGRATION OF ADDITIONAL FUNCTIONALITY INTO ENTERPRISE SOFTWARE WITHOUT CUSTOMIZATION OR APPARENT ALTERATION OF SAME

(75) Inventors: Sreenivasan Muniswamy, San Ramon, CA (US); Ramesh Panchagnula, Dublin, CA (US); Raghu Yelluru, San Ramon, CA (US)

(73) Assignee: Smart ERP Solutions Inc., Pleasanton, CA (US)

( * ) Notice: Subject to any disclaimer, the term of this patent is extended or adjusted under 35 U.S.C. 154(b) by 884 days.

(21) Appl. No.: 12/897,715

(22) Filed: Oct. 4, 2010

(65) Prior Publication Data

US 2012/0084683 A1 Apr. 5, 2012

(51) Int. Cl.
*G06F 3/00* (2006.01)

(52) U.S. Cl.
USPC ........................................................ 715/700

(58) Field of Classification Search
CPC ............ G06F 17/30; G06F 11/30; G06F 3/00
USPC ................................................... 715/762, 700
See application file for complete search history.

(56) References Cited

U.S. PATENT DOCUMENTS

| | | | | |
|---|---|---|---|---|
| 6,115,040 | A * | 9/2000 | Bladow et al. | 715/741 |
| 7,091,236 | B1 * | 8/2006 | Roberts et al. | 514/424 |
| 7,225,249 | B1 * | 5/2007 | Barry et al. | 709/227 |
| 2008/0263462 | A1 * | 10/2008 | Mayer-Ullmann et al. | 715/762 |
| 2009/0192783 | A1 * | 7/2009 | Jurach et al. | 704/4 |
| 2010/0324748 | A1 * | 12/2010 | Voysey | 700/295 |

\* cited by examiner

*Primary Examiner* — Boris Pesin
*Assistant Examiner* — Angie Badawi
(74) *Attorney, Agent, or Firm* — Gard & Kaslow LLP

(57) ABSTRACT

Additional functionality, referred to herein as an action, is added to existing enterprise software without customization or visible modification of the enterprise software itself. Such added functionality is user selectable via an added web page frame yet still triggers typical event handler processing of changed data within a component web page frame. Seamlessly adding such functionality thus allows for easy installation and uninstallation as desired.

20 Claims, 5 Drawing Sheets

SEAMLESS INTEGRATION OF ADDITIONAL FUNCTIONALITY INTO ENTERPRISE SOFTWARE WITHOUT CUSTOMIZATION OR APPARENT ALTERATION OF SAME

BACKGROUND

1. Field of the Invention

The invention is in the field of enterprise software, and more particularly to adding functionality to existing enterprise software.

2. Related Art

Enterprise software, otherwise known as Enterprise Application Software (EAS), is software used by organizations such as businesses or government to perform organizational functions. Examples of enterprise software include Human Resource Management Systems (HRMSs) and Customer Relationship Management (CRM) software distributed by such companies as Oracle Corporation of Redwood City, Calif. who acquired PeopleSoft, Inc. of Pleasanton, Calif. in 2005.

As the use of such software has increased so has the desire for organizations to customize such software to provide additional functionality to support their particular operational needs. Unlike software primarily operated by individuals to perform individual tasks on standalone computers, which is typically licensed via a shrink-wrapped software license which does not allow customization, enterprise software is commonly provided with access to the underlying instructions of the enterprise software and programmatic tools for such customization (e.g., PeopleCode and PeopleTools as provided by Oracle Corp./PeopleSoft, Inc.) and is licensed accordingly.

However, customization of enterprise software comes with its own challenges. At a minimum, an organization wishing to customize their enterprise software must know how to use the programmatic tools for the enterprise software, decide what customizations it wants and determine how to implement them using the programmatic, tools. But even more significantly, such customizations can create conflicts with the enterprise software, particularly with subsequent new releases of the enterprise software. Such conflicts can be created by an improperly implemented customization or simply by the newly released enterprise software being at odds with the customization.

What is needed, therefore, is a way to seamlessly integrate additional functionality without causing the typical customization conflicts and issues and, further, to easily be able to uninstall such additional functionality when a new release is received and after which be able to easily reinstall the additional functionality as desired.

SUMMARY

A method and system for seamless integration of additional functionality into an enterprise software component frame, including installation and uninstallation of same, is shown and described herein with reference to a number of specific embodiments.

In one embodiment is a method for adding functionality to enterprise software comprising: creating in an application server a user device screen layout comprising a component frame with a hidden field and an action frame with a selectable action; communicating the user device screen layout from the application server to a web server; transmitting the user device screen layout from the web server across a network to a user device; displaying the user device screen layout on the user device; receiving at the user device a user selection of the selectable action in the action frame of the displayed user device screen layout; causing a change in data of the hidden field of the component frame in response to the user selection of the selectable action of the action frame of the displayed user device screen layout; transmitting the changed data of the component frame from the user device across the network to the web server; communicating the changed data of the component frame from the web server to the application server; identifying in the application server the changed data of the component frame and based on the identified changed data in the component frame either: i) the application server creating either a new screen layout comprising a different component frame or instructions for the action to be performed and communicating the new screen layout or instructions for the action to be performed to the web server and the web server transmitting the new screen layout or instructions for the action to be performed across the network to the user device for display of the new screen layout or performance of the action to be performed on the user device according to the received instructions, or ii) the application server performing the action.

In another embodiment is a system for adding functionality to enterprise software comprising: an application server configured to create a user device screen layout comprising a component frame with a hidden field and an action frame with a selectable action and further configured to communicate the user device screen layout to a web server; the web server configured to transmit the user device screen layout across a network to a user device; a user device configured to display the user device screen layout; the user device further configured to detect a user selection of the selectable action in the action frame of the displayed user device screen layout; the user device further configured to cause a change in data of the hidden field of the component frame in response to detecting the user selection of the selectable action in the action frame of the displayed user device screen layout; the user device further configured to transmit the changed data of the component frame from user device across the network to the web server; the web server further configured to communicate the changed data of the component frame to the application server; the application server further configured to identify the changed data of the component frame and based on the identified change data in the component frame either: i) create a new screen layout comprising a different component frame or instructions for the action to be performed and communicate the new screen layout or instructions for the action to be performed to the web server, the web server further configured to transmit the new screen layout or instructions for the action to be performed across the network to the user device and the user device further configured to either display the new screen layout or perform the action to be performed according to the received instructions, or ii) perform the action.

DETAILED DESCRIPTION

In various embodiments of the present invention some additional functionality, referred to herein as an action, is added to (installed in) existing enterprise software without the need for programmatic customization which would cause a change to be made to the underlying enterprise software and would then have to be managed by the organization. The additional functionality is added to the enterprise software in a way that is seamless in that there is no visual indication to the user of any change or customization to the enterprise software itself. Further, such added/installed additional functionality can as easily be removed from (uninstalled from) the enterprise software which is useful for upgrading the enterprise software to a new release or for other purposes (e.g., testing or diagnostics of the enterprise software).

Figure 1:
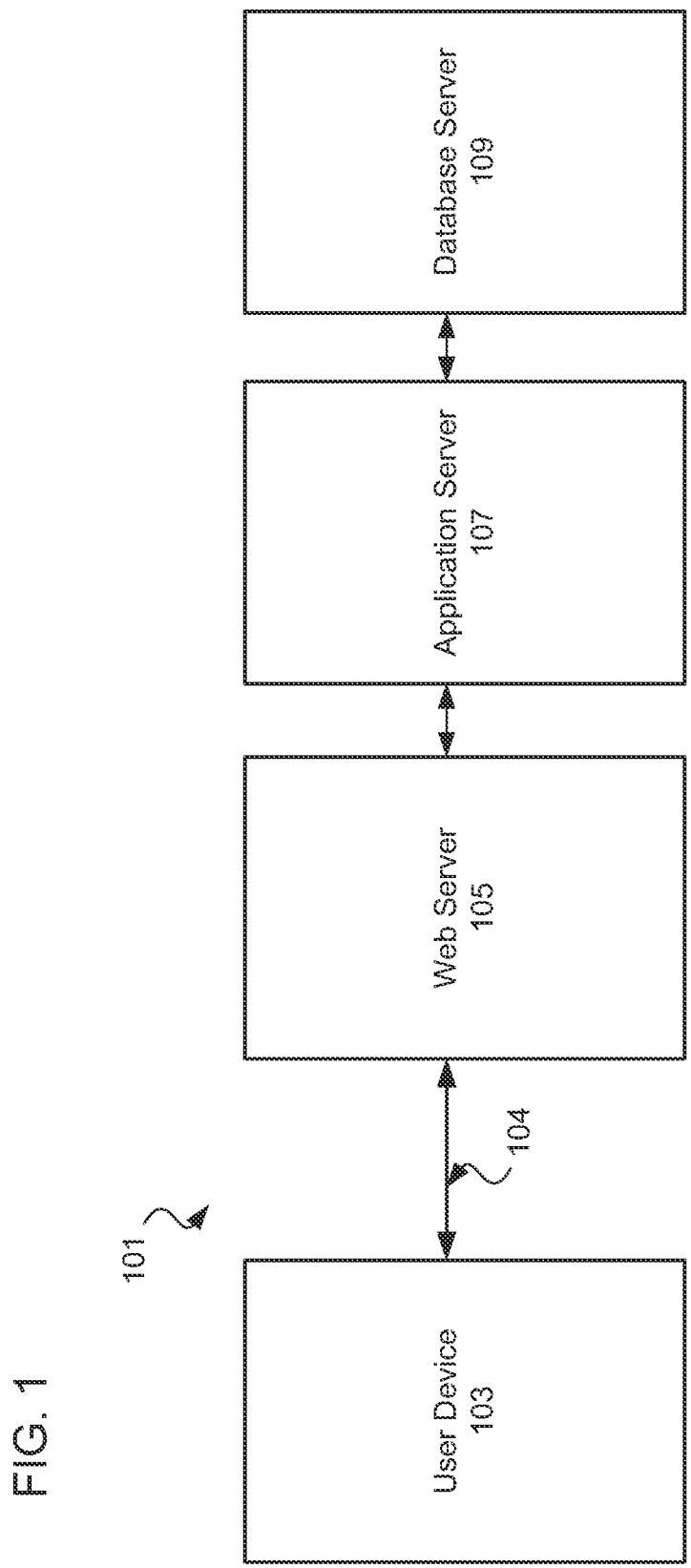
FIG. 1 is a block diagram of an enterprise software system as may be used according to an embodiment of the present invention.

Referring now to FIG. 1, a block diagram of a typical enterprise software system 101 as may be used according to an embodiment of the present invention, and as used in what is known as the PeopleSoft internet architecture (PIA), can be seen. Enterprise software system 101 comprises a user device 103, a web server 105, an application server 107 and a database server 109. Use device 103 is typically a personal computer running some internet browser software such as Internet Explorer by Microsoft Corp. of Redmond, Wash. User device 103 in conjunction with the browser software is in communication across a network connection, such as the internet, (represented by connecting line 104) to web server 105. Web server 105 is, in turn, in communication with application server 107 which is a computing device that runs the enterprise software. Application server 107, in turn, is in communication with database server 109 that maintains the data elements of the enterprise software.

In operation, application server 107 runs the enterprise software and generates a user screen layout in a web page format using data obtained from database server 109. The user screen layout is communicated to web server 105 and then across network connection 104 to user device 103 for display to a user of user device 103 using the browser software. As is known in the art, the user screen layout displayed on the user device 103 can comprise more than one web browser page frame of content.

Figure 2:
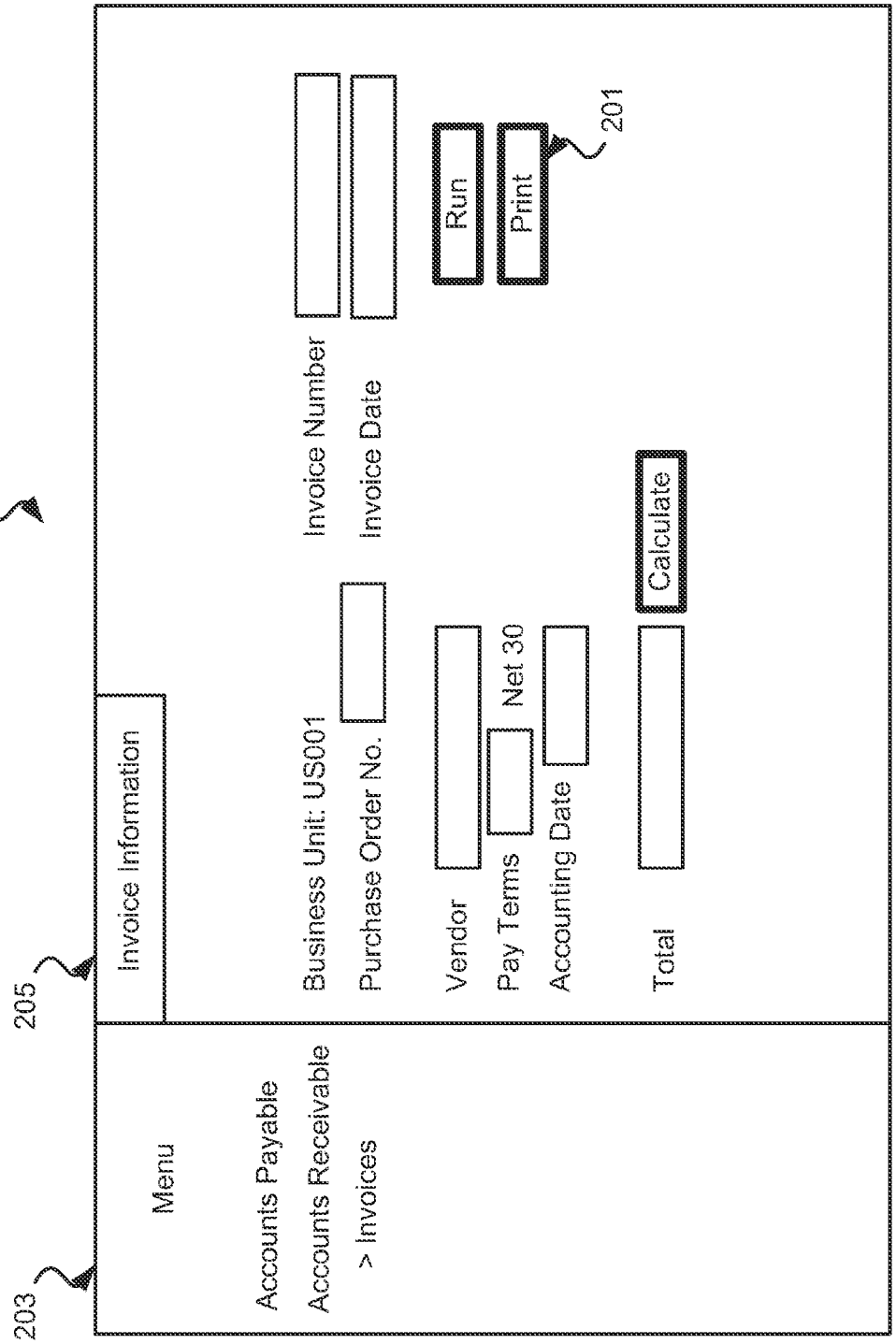
FIG. 2 is a screenshot of a prior art enterprise software component frame.

Referring now to FIG. 2, an example screenshot 201 of a user screen layout from a PeopleSoft-branded enterprise software web browser page can be seen. As is known in the art, such a PeopleSoft-branded enterprise software user screen layout typically comprises both a menu frame 203 and a component frame 205. As is also known in the art, menu frame 203 provides the user with the ability to select from one of various possible options for display within component frame 205.

Such enterprise software systems, including those of the PIA type, follow an event drive model where the enterprise software running on application server 107 (FIG. 1) invoke processing events based on the user actions taken within the displayed web page on user device 103. As such, the user can enter data into the various data fields and/or select various operations (which is also basically treated as an entering of data) within component frame 205, as known and shown. A user entering such data or selecting such operations, triggers what is known as a "submit" operation which causes the sending of the data within component frame 205 from user device 103 (FIG. 1) across network connection 104 to web server 105 which in turn communicates it to application server 107. The enterprise software running on application server 107 then analyzes the component frame data to identify what has been changed from the originally sent user screen layout previously sent from the application server 107. These identified differences, which can include any user input data and/or selected operations, are then used by the enterprise software to determine what operations to perform. With some component page frames, such operations can include, for example, saving a copy of the user entered data in database server 109. With some component page frames, such operations can also include running some user selected operation such as generate an invoice, for example, which would cause the enterprise software running on application server 107 to generate a new screen layout for the invoice, communicate that invoice screen layout to web server 105 which would in turn communicate the invoice screen layout across network 104 to user device 103 for display to the user (not shown).

It is to be understood that this sequence of events, from user data input or operation selection within a component frame 205 of user device 103, to enterprise software running on application server 107 identifying and operating on identified data differences and generating and communicating a new screen layout back to user device 103 is all known within the art.

However, as is known in the art, many such screen layouts, and in particular component frames such as component frame 205, do not include all the functionality a user may desire. For example, although component frame 205 does include a "print" button 207 thus indicating that it provides the ability for a user to print the contents of component frame 205, many other such enterprise software generated component frames do not include such print functionality. As such, absent customization of the enterprise software with its inherent problems, a user of those component frames has no ability to print them.

Figure 3:
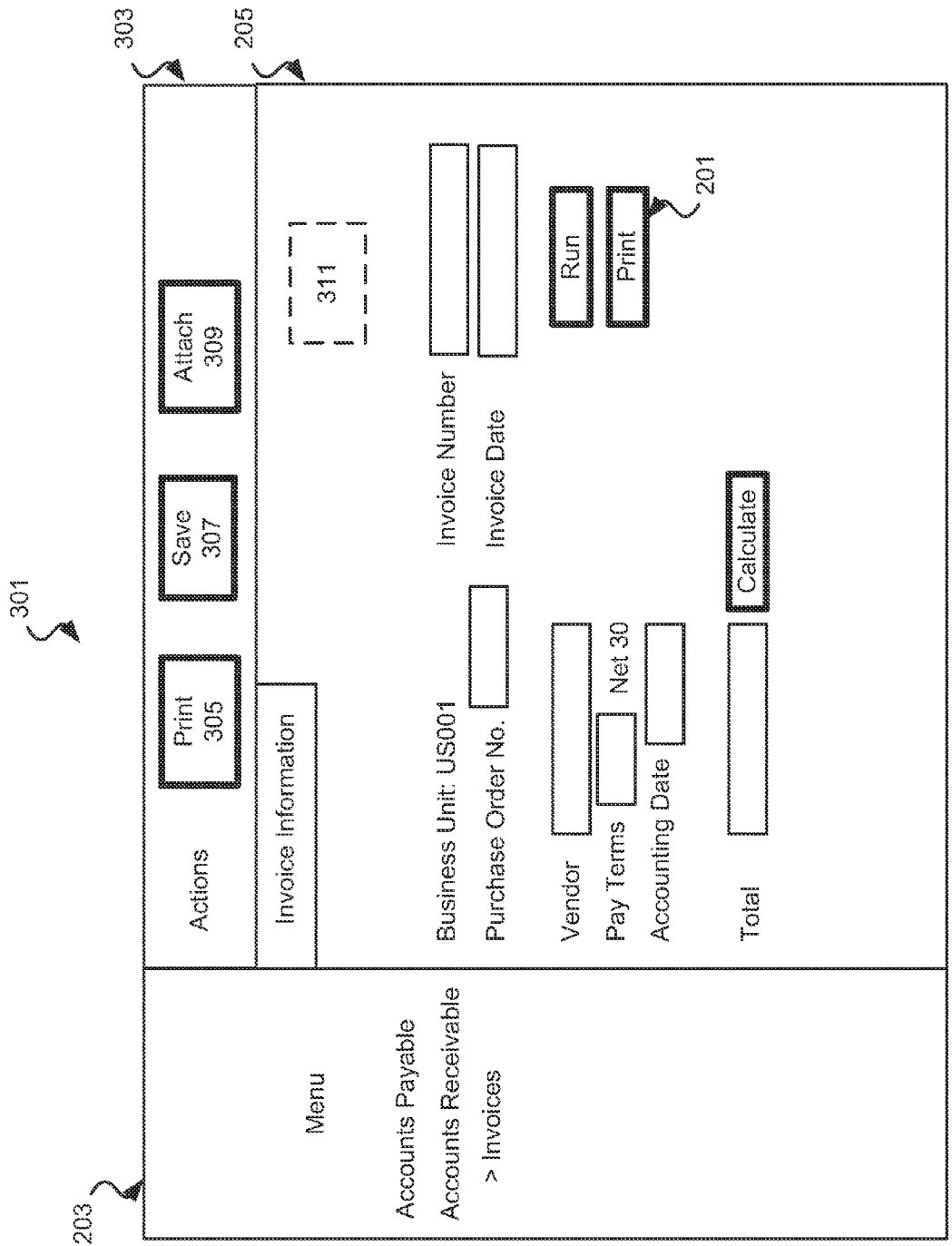
FIG. 3 is a screenshot of an enterprise software component frame and an action frame according to an embodiment of the present invention.

Referring now to FIG. 3, a screenshot 301 of an enterprise software generated screen layout comprising menu frame 203, component frame 205 and an action frame 303 according to an embodiment of the present invention can be seen. In this embodiment, as with menu frame 203 and component frame 205, action frame 303 is generated by enterprise software running on application server 107 for display using browser software on user device 103 and includes one or more actions such as print 305, save 307 and attach 309, as shown in this example and as is further described elsewhere herein. Also in this embodiment, the enterprise software running on application server 107 also generates a hidden field 311 within component frame 205 as also described further elsewhere herein.

It is to be understood that although hidden field 311 is made visible in the figures herein, it is not visible to a user of user device 103, as indicated by the dashed line shown in the figure. A benefit of hidden field 311 being hidden and therefore not displayed is that it can overlap with other elements in component frame 205 without causing any software conflict, visual conflict or user confusion. Further, in one embodiment, hidden field 311 is inserted in what is known as "level-0" of the page buffer of component page frame 205 and, further, has an attribute filed definition set to "modifiable by javascript," which is a known field attribute in PeopleSoft enterprise software, to support its operation and functionality as explained further elsewhere herein.

Figure 4:
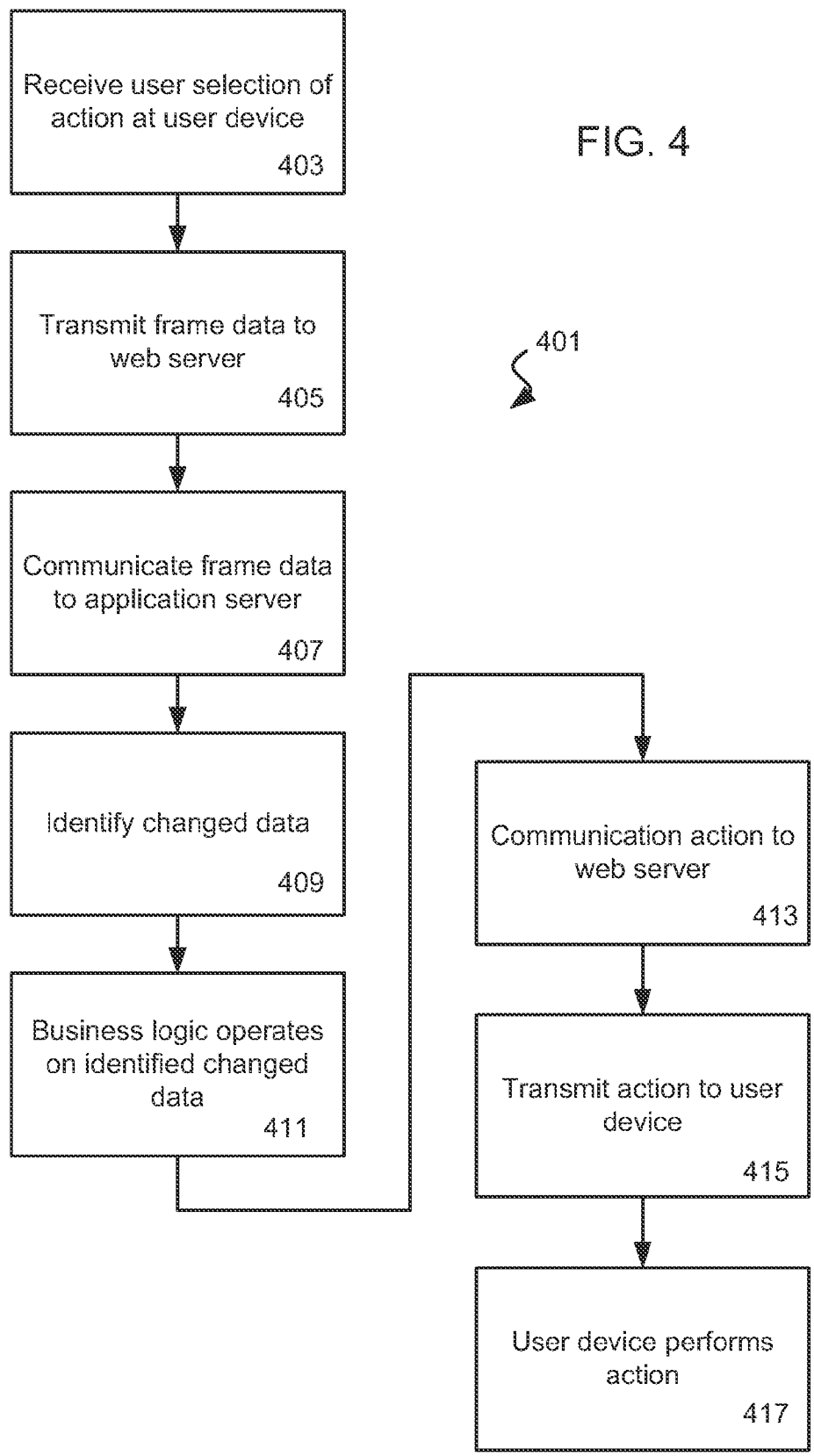
FIG. 4 is a flowchart of the execution sequence of an action according to an embodiment of the present invention.

Referring now to FIG. 4, flowchart of the execution sequence 401 of a user selecting an action according to an embodiment of the present invention can be seen. As with user selection of an operation within component frame 205, when a user selects one of the displayed actions in action frame 303, a communication is triggered from user device 103 (of FIG. 1) across network 104 to web server 105 to application server 107 for the enterprise software running thereon to identify differences vis-à-vis the previously generated screen layout and act thereon according to the business logic of the enterprise software. The particular steps of this execution sequence will now be explained.

In step 403, the user selection of an action such as print action 305 (FIG. 3) is received within user device 103 (FIG. 1). This can be accomplished using known techniques such as user device 103 detecting that a user has placed a screen cursor over print action 305 within action frame 303 using an input controller such as a computer mouse and clicked a button on the mouse in an operation known in the art as a user "clicking on" a display screen button.

In a first embodiment, in response to receiving such user selection, a javascript function call from action frame 303 to component frame 205 is made to change a value within hidden field 311. In one example, hidden field 311 uses a binary field value and the javascript function call to simply change the binary field value from its original value of zero to a value of one or from its original value of one to a value of zero. In this embodiment, hidden filed 311 is defined, according to known definitional types within PeopleSoft enterprise software, as a pushbutton/hyperlink type.

In a second embodiment, one or more actions within action frame 303, such as print action 305, are themselves implemented as pushbutton/hyperlink types according to known definitional types within PeopleSoft enterprise software rather than triggering any javascript function call to change any value within hidden field 311.

In step 405, the frame data is transmitted from user device 103 (FIG. 1) across network 104 to web server 105. The transmission itself is caused either by the change in field value of hidden field 311 triggering a pushbutton/hyperlink type operation according to the first embodiment described above or by the action itself being of the pushbutton/hyperlink type according to the second embodiment described above.

In step 407, the frame data is communicated from web server 107 (FIG. 1) to application server 109.

In step 409, the enterprise software running on application server 109 (FIG. 1) then identifies the changes made to the received frame data.

In step 411 the enterprise software running on application server 109 (FIG. 1) then operates on this identified changed data according to its business logic which, as explained further elsewhere herein, includes added hidden field change event logic in accordance with the first embodiment described above or added pushbutton/hyperlink change event logic in accordance with the second embodiment described above. Such operations may include, for example, saving the identified changed data to database server 109. Alternatively, such operations may include generating a new screen layout or operation for communication back to user device 101. In the latter case, in step 413, application server 109 communicates this new screen layout or operation to web server 107.

In step 415, web server 107 (FIG. 1) transmits the new screen layout or operation across network 104 to user device 103. In step 417, user device 103 (FIG. 1) displays and/or performs the new screen layout or operation, as appropriate, using the browser software. For example, in the case of a print action, this could comprise display on user device 103 of a new screen layout in a print page mode and appropriate communications within the browser software running on user device 103 to initiate a print function with an operating system of user device 103 accordingly. As another example, in the case of an attach action, this could comprise appropriate communications within the browser software running on user device 103 to initiate an open file function within the operating system of user device 103 to thus allow a user to locate and thereby attach an electronic file to the currently displayed component page frame for communication back to application server 107.

Figure 5:
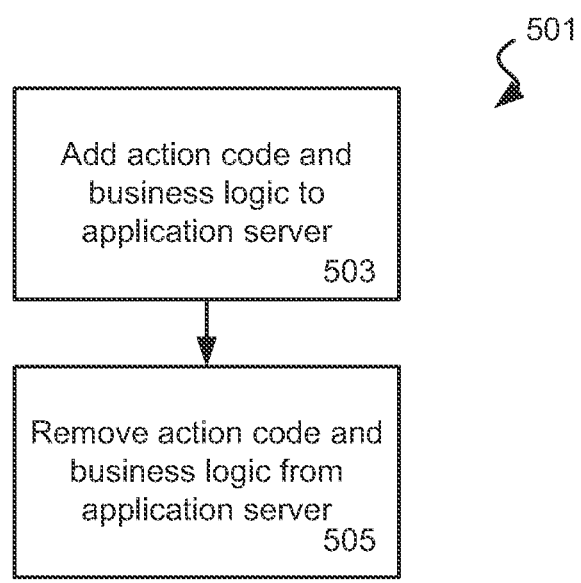
FIG. 5 is flowchart of the installation and uninstallation process according to an embodiment of the invention.

Referring now to FIG. 5, a flowchart of the installation and uninstallation process 501 according to an embodiment of the invention can be seen.

In step 503, action code and business logic is added to (installed in) the enterprise software running on application server 107 (FIG. 1). The action code is the programming code which causes the enterprise software running on application server 107 to generate hidden field 311 within component frame 205 and action frame 303 (FIG. 3). The business logic is the programming code or action event handler which causes the enterprise software running on application server 107 to recognize and operate on the changed data or pushbutton/hyperlink action when frame data is returned to application server 107. Installation of the action code ensures that hidden field 311 gets initialized when component frame 205 gets loaded. Installation of the business logic ensures that the action event handler gets registered with the enterprise software on application server 207.

In step 505, action code and business logic is removed from (uninstalled from) the enterprise software running on application server 107 (FIG. 1). Removing the action code and business logic thus prevents generation of hidden field 311 within component frame 205 and action frame 303. Such removal also returns the enterprise software to its original condition thereby making it available for new release upgrades, testing and diagnostic work, etc., without any concern for possible conflicts as may occur with customization of the enterprise software. Then when desired, for example after installation of a new release upgrade, the installation step 503 can again be performed thereby again providing the action functionality to the enterprise software.

It is to be understood that the execution sequence(s) of FIG. 4 would occur after at least one instance of adding action code and business logic to the enterprise software running on application server 107.

It is to be understood that the added functionality possible according the approach described herein is not limited to the specific actions described herein and can include all currently known actions as well as those newly conceived of in the future. For example, in addition to or in place of adding the action of print, save and attach, other possible actions include save as (save the component frame data as either a new component frame or the same component frame despite the fact that not all required data fields have been filled in), save as template (save the component frame data as a template comprised of default values for future use), help, extended data (extensions to the existing set of data for a given component page frame data), etc.

It is to be understood that network connection 104 (FIG. 1), as well as communication between web server 105, application server 107 and database server 109, is intended to cover any combination of wired and/or wireless local area network, wide area network, cellular telephone network (voice and/or data), and/or the Internet to support the functionality described herein.

It is to be understood that web server 105 (FIG. 1) and application server 107 can be implemented as two physically separate computing devices or can be implemented as a single computing device, as is known in the art.

It is to be understood that the action code and business logic described herein can not only run on an application server such as application server 107 of FIG. 1, but can also be stored in any computer readable medium including working or long-term memory of the application server or in any other form of computer readable medium including portable memory now known or later developed (e.g., on a CD, DVD, flash-based storage, disk-based memory, etc.), or stored on any such form of memory on some other server co-located with the application server or accessible across some network. Additionally, the action code and business logic can be stored or distributed separate from or combined with any portion or form of enterprise software as desired.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, the description and the drawing should not be considered in a limiting sense, as it is understood that the present invention is in no way limited to only the embodiments illustrated.

What is claimed is:

1. A method for adding functionality to enterprise software comprising:
   creating in an application server a user device screen layout comprising a component frame with a hidden field and an action frame with a selectable action;
   communicating the user device screen layout from the application server to a web server;
   transmitting the user device screen layout from the web server across a network to a user device;
   displaying the user device screen layout on the user device;
   receiving at the user device a user selection of the selectable action in the action frame of the displayed user device screen layout;
   causing a change in data of the hidden field of the component frame in response to the user selection of the selectable action of the action frame of the displayed user device screen layout;
   transmitting the changed data of the component frame from the user device across the network to the web server;
   communicating the changed data of the component frame from the web server to the application server;
   identifying in the application server the changed data of the component frame and based on the identified changed data in the component frame either:
   i) the application server creating either a new screen layout comprising a different component frame or instructions for the action to be performed and communicating the new screen layout or instructions for the action to be performed to the web server and the web server transmitting the new screen layout or instructions for the action to be performed across the network to the user device for display of the new screen layout or performance of the action to be performed on the user device according to the received instructions, or
   ii) the application server performing the action.

2. The method of claim 1 wherein causing a change in data of the hidden field of the component frame in response to the user selection of the selectable action of the action frame of the displayed user device screen layout is accomplished by a javascript function call from the action frame to the component frame to change a value in the hidden field in the component frame.

3. The method of claim 1 wherein causing a change in data of the hidden field of the component frame in response to the user selection of the selectable action of the action frame of the displayed user device screen layout is accomplished by a javascript function call from the action frame to the component frame to indicate selection of a pushbutton/hyperlink type button.

4. The method of claim 1 wherein the action is a print function.

5. The method of claim 1 wherein the action is a save function.

6. The method of claim 1 wherein the action is a attach function.

7. The method of claim 1 wherein the action is a save as function.

8. The method of claim 1 wherein the action is a template function.

9. The method of claim 1 wherein the action is a help function.

10. The method of claim 1 wherein the action is an extended data function.

11. An apparatus for adding functionality to enterprise software comprising:
    an application server configured to create a user device screen layout comprising a component frame with a hidden field and an action frame with a selectable action and further configured to communicate the user device screen layout to a web server;
    the web server configured to transmit the user device screen layout across a network to a user device;
    a user device configured to display the user device screen layout;
    the user device further configured to detect a user selection of the selectable action in the action frame of the displayed user device screen layout;
    the user device further configured to cause a change in data of the hidden field of the component frame in response to detecting the user selection of the selectable action in the action frame of the displayed user device screen layout;
    the user device further configured to transmit the changed data of the component frame from user device across the network to the web server;
    the web server further configured to communicate the changed data of the component frame to the application server;
    the application server further configured to identify the changed data of the component frame and based on the identified change data in the component frame either:
    i) create a new screen layout comprising a different component frame or instructions for the action to be performed and communicate the new screen layout or instructions for the action to be performed to the web server, the web server further configured to transmit the new screen layout or instructions for the action to be performed across the network to the user device and the user device further configured to either display the new screen layout or perform the action to be performed according to the received instructions, or
    ii) perform the action.

12. The system of claim 11 wherein the user device further configured to cause a change in data of the hidden field of the component frame in response detecting the user selection of the selectable action of the action frame of the displayed user device screen layout is accomplished by a javascript function call from the action frame to the component frame to change a value in the hidden field in the component frame.

13. The system of claim 11 wherein causing a change in data of the hidden field of the component frame in response to the user selection of the selectable action of the action frame of the displayed user device screen layout is accomplished by a javascript function call from the action frame to the component frame to indicate selection of a pushbutton/hyperlink type button.

14. The system of claim 11 wherein the action is a print function.

15. The system of claim 11 wherein the action is a save function.

16. The system of claim 11 wherein the action is a attach function.

17. The system of claim 11 wherein the action is a save as function.

18. The system of claim 11 wherein the action is a template function.

19. The system of claim 11 wherein the action is a help function.

20. The system of claim 11 wherein the action is an extended data function.

* * * * *